United States Patent [19]
Moroz

[11] Patent Number: 4,602,852
[45] Date of Patent: Jul. 29, 1986

[54] ACOUSTO-OPTIC DEFLECTOR SYSTEMS

[75] Inventor: John Moroz, Harlow, England

[73] Assignee: International Standard Electric Corporation, New York, N.Y.

[21] Appl. No.: 599,900

[22] Filed: Apr. 13, 1984

[30] Foreign Application Priority Data

Apr. 23, 1983 [GB] United Kingdom ............... 8311092

[51] Int. Cl.$^4$ .......................... G02B 1/33; G01C 1/00
[52] U.S. Cl. .................................. 350/358; 356/152; 364/822
[58] Field of Search ...................... 350/358, 371, 373; 219/121 LU; 307/425, 429; 364/822, 827; 324/77 K; 343/384, 5 SA, 9 PS, 417; 455/611, 615, 619; 356/152; 332/7.51

[56] References Cited

U.S. PATENT DOCUMENTS

| | | | |
|---|---|---|---|
| 3,516,853 | 5/1985 | Pearson | 356/152 |
| 3,585,392 | 6/1971 | Korpel | 332/7.51 |
| 4,012,120 | 3/1977 | Kagiwada et al. | 364/822 |
| 4,297,704 | 10/1981 | Marom et al. | 364/822 |
| 4,421,388 | 12/1983 | Berg et al. | 350/358 |
| 4,468,084 | 8/1984 | Hutcheson et al. | 364/822 |

OTHER PUBLICATIONS

Rhodes, W. T., "Acousto-Optic Signal Processing: Convolution & Correlation", Proc. IEEE, 1-1981, pp. 65-79.

Coppock et al, "Bragg Cell RF Signal Processing", Microwave Jr., 9-1978, pp. 62-65.

Primary Examiner—William H. Punter
Attorney, Agent, or Firm—T. L. Peterson; J. M. May

[57] ABSTRACT

An acousto-optic deflector system including first and second transducers for producing acoustic waves for interaction with an optic beam in an acousto-optic device. The transducers are driven by signals of differing frequencies ($f_1 + \Delta f$, $f_1$) in order to produce two deflected optical beams from an incident optical beam launched from a laser. The two deflected beams are detected by a common photodetector whose output is filtered whereby to separate a component which is dependent on the frequency difference. The phase of this component is the relative optical phase of the two deflected optical beams. By determining the phase of the component for different frequencies ($f_1$, $F_1 = f_T$ etc.), the optical angle of incidence ($\theta_i$) may be obtained. Alternatively, by frequency modulating both transducer drive signals and appropriately electronically processing the detector output, a signal whose amplitude varies with the optical angle of incidence can be obtained. This signal is a minimum when the optical angle of incidence is optimized. Optimization of the optical angle of incidence can be performed automatically.

11 Claims, 4 Drawing Figures

ACOUSTO-OPTIC DEFLECTOR SYSTEMS

BACKGROUND OF THE INVENTION

This invention relates to acousto-optic deflector systems and in particular, but not exclusively, to systems for use in setting the angle of incidence of an optical beam relative to sound waves in an acousto-optic device.

PRIOR ART STATEMENT

Acousto-optic interaction is well documented. Light propagating through a transparent acousto-optic material, for example lithium niobate $LiNbO_3$, is diffracted by a sound wave propagating in the material which modulates the refractive index of the material. The sound wave may be either a bulk wave or a surface acoustic wave. The light may be either guided or unguided. The sound waves may be generated by applying an electrical signal of a particular frequency either to bulk plate or layer transducers in the case of bulk waves, or to interdigitated transducers in the case of surface acoustic waves.

Many acousto-optic devices use more than one sound wave to deflect energy from an incident optical beam. Typically, two transducers are employed generating sound waves of the same frequency, with the objective of obtaining two deflected light beams from these two sound waves. These two deflected light beams should have a desired relative phase, typically close to zero degrees phase difference. Further, it is normally important that the relative phase between these two deflected light beams should not change significantly as the frequency of the two sound waves are both changed together over a specified frequency range. These features are controlled predominantly by the angle of incidence of the optical beam, although they are also dependent on the phase of the electrical signals fed into the electric-to-acoustic transducers since this controls the phase of the sound waves.

SUMMARY OF THE INVENTION

According to one aspect of the present invention there is provided an acousto-optic deflector system including a body of acousto-optic material; first and second transducer means adapted to produce respective acoustic signals of differing frequency in the body, whereby to produce first and second deflected optical beams from an optical beam directed through the body in use of the deflector system; common detector means for detecting the first and second optical beams, and signal processing means serving in use of the deflector system to separate the component of the detector means output signal which is dependent on the frequency difference between the acoustic signals, the phase of which component corresponds to the relative optical phase of the first and second deflected optical beams.

According to another aspect of the present invention there is provided a method of operating an acousto-optic system comprising the steps of launching an optical beam into a body of an acousto-optic material; deflecting the optical beam by means of first and second acoustic signals of differing frequency produced in the body, whereby to obtain a first and second deflected optical beam; detecting the first and second deflected optical beams by means of a common detector and processing the detector output signal whereby to separate a component therefrom which is dependent on the frequency difference bewtween the first and second acoustic signals, the phase of which component corresponds to the relative optical phase of the first and second deflected optical beams.

BRIEF DESCRIPTION OF THE DRAWINGS

In the accompanying drawings which illustrate exemplary embodiments of the present invention.

DESCRIPTION OF THE PREFERRED EMBODIMENTS

Figure 1:
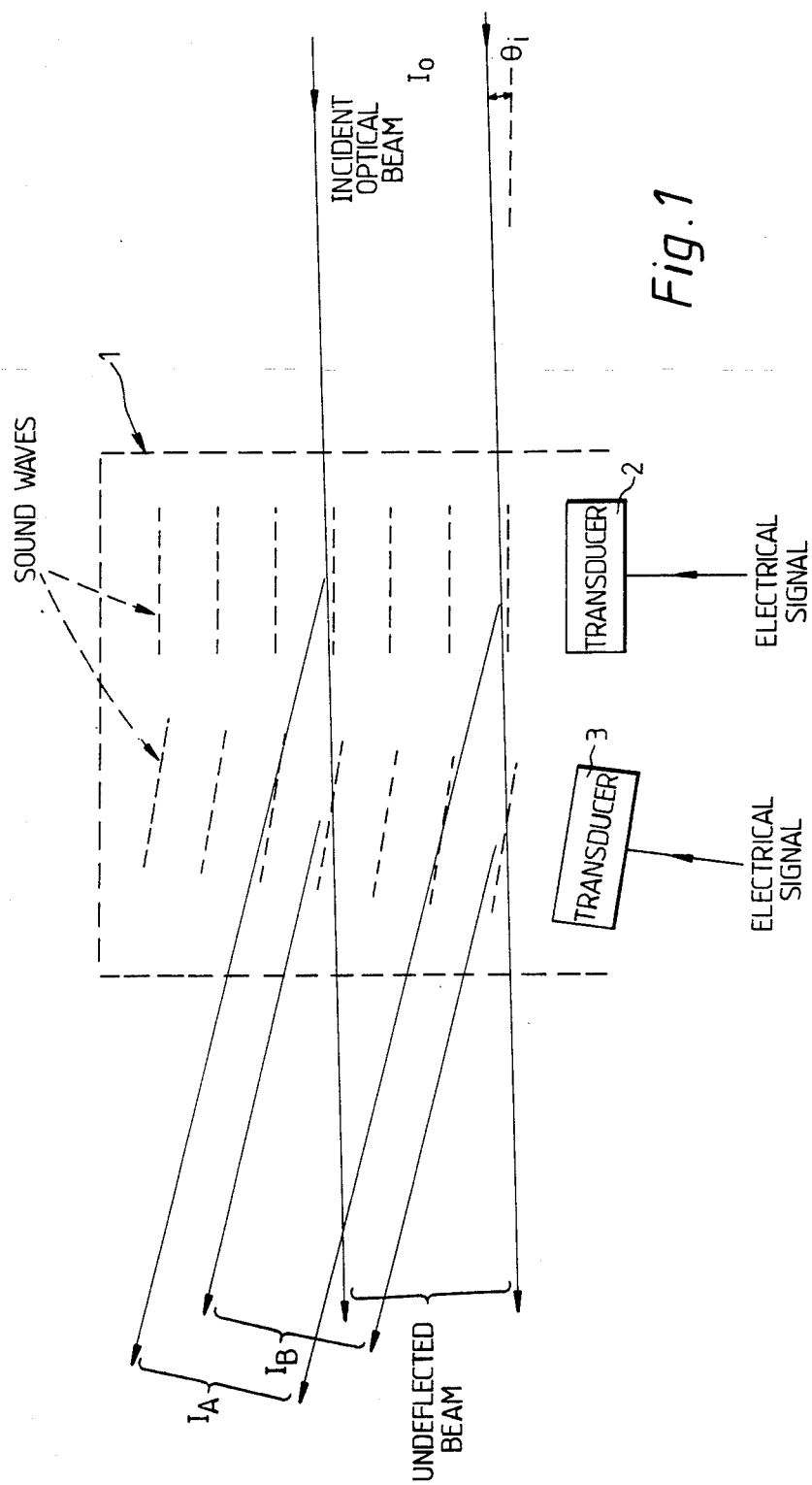
FIG. 1 is a diagrammatic view illustrating the interaction of an optical beam with two sound waves in an acousto-optic material in accordance with the present invention.

Referring firstly to FIG. 1, an optical beam $I_o$ is incident on a body 1 of acousto-optic material at an angle of incidence $\theta_i$ measured relative to the normal to the direction of propagation of the sound waves generated in response to application of an electrical signal to a first transducer 2. Interaction of the optical beam $I_o$ with the sound waves generated by transducer 2 results in a diffracted optical beam $I_A$. Interaction of the incident optical beam $I_o$ with the sound waves generated by a second transducer 3 results in a diffracted optical beam $I_B$. In order for the deflected optical energy generated by the different sound waves to combine constructively it is important to accurately set the angle of incidence $\theta_i$. A technique for measuring the relative phase $\Delta\phi$ between the deflected light beams $I_A$ and $I_B$, and thus enabling $\theta_i$ to be accurately set, will now be discussed.

The deflected light beams $I_A$ and $I_B$ have amplitudes A and B, respectively. Consider the two beams at a point where they overlap.

Electric field of beam $I_A=$ $$kA \cos [2\pi(f_c+f_1)t+\phi_1]$$

Electric field of beam $I_B=$ $$kA \cos [2\pi(f_c+f_2)t+\phi_2]$$

where
k = constant,
$f_c$ = optical frequency,
$f_1, f_2$ are the frequencies of the first and second sound waves (produced by transducers 2 and 3) respectively, and
$\phi_1, \phi_2$ are phase terms.

Suppose the two sound waves have the same frequency, then the current $i_d$ they generate when they strike a photodiode, which is given by $$i_d \propto A^2+B^2+2AB \cos [2\pi t[(f_c+f_1)-(f_c+f_2)]+\phi_1-\phi_2],$$

becomes $$i_d \propto A^2+B^2 2AB \cos [\phi_1-\phi_2]$$

writing $\phi_1 - \phi_2$ as $\Delta\phi$ $i_d \propto A^2 + B^2 + 2AB \cos \Delta\phi$ Thus the photodiode current $i_d$ depends on the amplitudes of the two light beams and on the relative phase of the two light beams in a complex manner.

Suppose now that the sound waves have very slightly different frequencies. The current $i_{d1}$ the light beams generate when they strike a photodiode is in this case given by $i_{d1} \propto A^2 + B^2 + 2AB \cos[2\pi t(f_1-f_2) + (\phi_1-\phi_2)]$ or, writing $(\phi_1-\phi_2)$ as $\Delta\phi$ and $(f_1-f_2)$ as $\Delta f$ $i_{d1} \propto A^2 + B^2 + 2AB \cos[2\pi t \Delta f + \Delta\phi]$ We now have a signal of frequency of which may be electronically separated from the d.c. term. The relative phase $\Delta\phi$ of the two optical beams is imposed on this signal of frequency $\Delta f$ and may readily be measured.

Further, from such measurements of $\Delta\phi$ we may determine the angle of incidence $\theta_i$ in a repeatable manner, as follows. Suppose that $\Delta f$ is small compared with $f_1$, the frequency of the sound waves produced by the first transducer 2. In addition, $\Delta\phi = \phi[\theta_i, f_1, E_o, G]$, that is the phase difference $\Delta\phi$ is dependent on the optical angle of incidence $\theta_i$, the frequency $f_1$ of the sound, the relative phases $E_o$ of the electrical signals fed to the transducers, and on a geometry factor $G$ which depends on the positions and directions of the sound waves but which is fixed for a given device.

Let $\Delta\phi$ be measured for each of two sound frequencies $f_1$ and $f_T$, more than two values could be employed if desired, with the proviso that $|\Delta f| << |f_T - f_1|$, that is the frequency difference between the two sound waves used simultaneously is small compared with the two sequential measurement frequencies.

$\Delta\phi_1 = \phi[\theta_i, f_1, E_o, G]$ $\Delta\phi_T = \phi[\theta_i, f_T, E_o, G]$ In practice the change in $\Delta\phi$ between the two frequencies is predominantly dependent on the variable parameter $\theta_i$, the beam angle of incidence. In other words $\Delta\phi_1 - \Delta\phi_T$ indicates the beam angle of incidence $\theta_i$. This allows for a simple way of minimizing the change in $\Delta\theta$ as the sound frequency is varied (phase change minimization) which is a common practical requirement.

For the purposes of this explanation $\Delta\phi$ is considered to be a roughly linear function of the frequency of sound $f_s$ over a limited frequency range. $\Delta\phi = Lf_s$. This assumption will not affect the experimental result. If the sound frequency is sinusoidally varied by controlling the electrical frequency, then $f_s = f_x + f_{dev} \sin 2\pi f_d t$ where
$f_x$ is the center frequency
$f_{dev}$ is the frequency deviation and
$f_d$ is the frequency modulation frequency.
Thus $\Delta\phi = L[f_x + f_{dev} \sin 2\pi f_d t]$ and the detected photo diode current $i_d$ will be given by $i_{d1} \propto A^2 + B^2 + 2AB \cos[2\pi t \Delta f + \Delta\phi]$ The alternating current term $(i_d)_{ac}$ of which is given by $(i_d)_{ac} \propto 2AB \cos[2\pi t \Delta f + \Delta\phi]$ or $(i_d)_{ac} \propto 2AB \cos[2\pi t \Delta f + Lf_x + Lf_{dev} \sin 2\pi f_d t]$ which can be rewritten as $(i_d)_{ac} \propto 2AB\{J_0(Lf_{dev})\cos(2\pi\Delta f\, t + Lf_x) -$
$\quad J_1(Lf_{dev})[\cos(2\pi t(\Delta f - f_d) + Lf_x) -$
$\quad \cos(2\pi t(\Delta f + f_d) + Lf_x)] + \text{higher order sidebands}\}$ If this signal $(i_d)_{ac}$ is mixed with a signal of frequency $\Delta f$, then sum and difference frequencies will result in addition to the original frequencies. Among these will be a signal $i_L$ given by $i_L \propto 2J_1(Lf_{dev}) \cos(2\pi f_d t)$.

This signal can be readily separated from the others by electronic frequency filtering. It is the amplitude of this signal that indicates the magnitude of L. Provided that the product $Lf_{dev}$ is not too large, then a reduction in $i_L$ will indicate a reduction in L, the relative phase change with the frequency of sound. The condition of the product $Lf_{dev}$ being too large is readily tested by reducing $f_{dev}$. If this causes an increase in $i_L$, then the product is too large.

Figure 2:
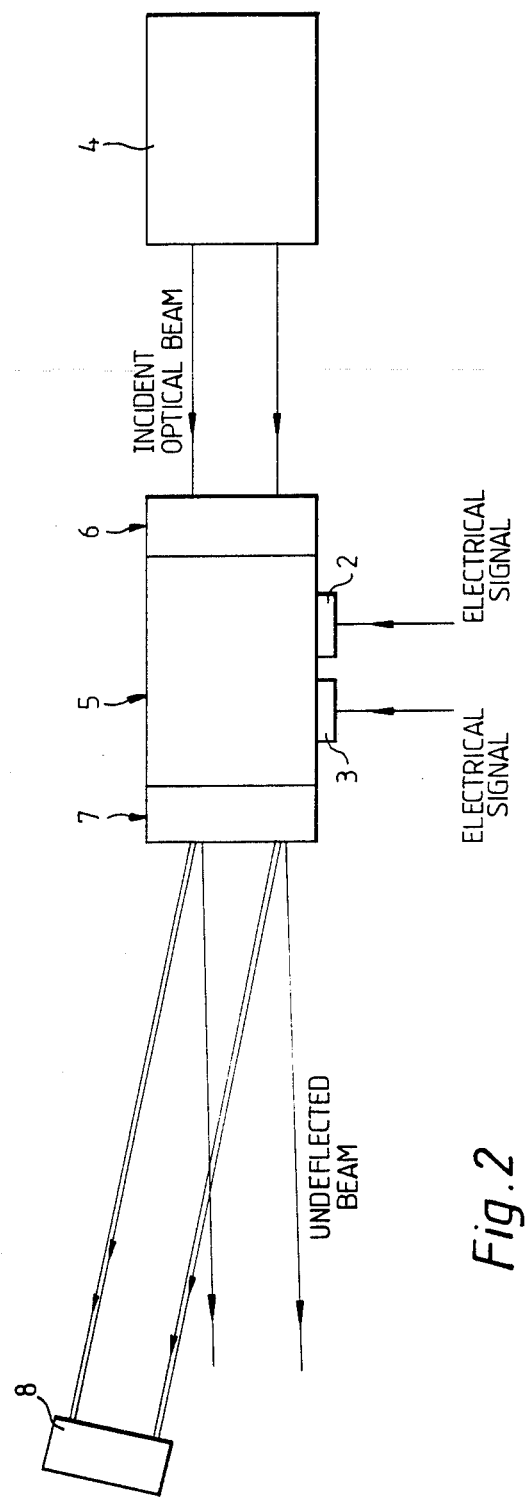
FIG. 2 is a side elevational view of an optical system constructed in accordance with the invention involving interaction as illustrated in FIG. 1.

The optical system for a practical implementation of the above is shown in FIG. 2. Light is launched from a high coherence laser 4 into an acousto-optic deflector 5 via conventional input optics 6 in a manner appropriate for acousto-optic deflection to occur. Electrical signals are applied to first and second transducers 2 and 3. Two deflected optical beams emerge via conventional output optics 7. It is preferable that these beams should be left, after the output optics, with about the same degree of collimation with which they left the acousto-optic interaction region of deflector 5. A photodiode 8 is placed to intercept the two deflected beams. The face size and placement of the photodiode 8 are important. The position of the photodiode 8 must be such that it intercepts the two deflected beams while they are overlapped. The distance from the acousto-optic deflector 5 is a trade off between placement far from the deflector 5, which will introduce noise due to path length differences of the two beams and the finite coherence of the laser 4. Placement close to the deflector 5 will also increase noise due to increased interception of the undeflected beam. The face size of the photodiode 8 should be large enough so that at least part of the two deflected beams strike the photodiode over the whole range of sound frequencies required in the measurement. The photodiode 8 has a face that should not be excessively large since this will cause loss of signal due to the change in relative phase of the two beams across the face of photodiode 8.

Figure 3:
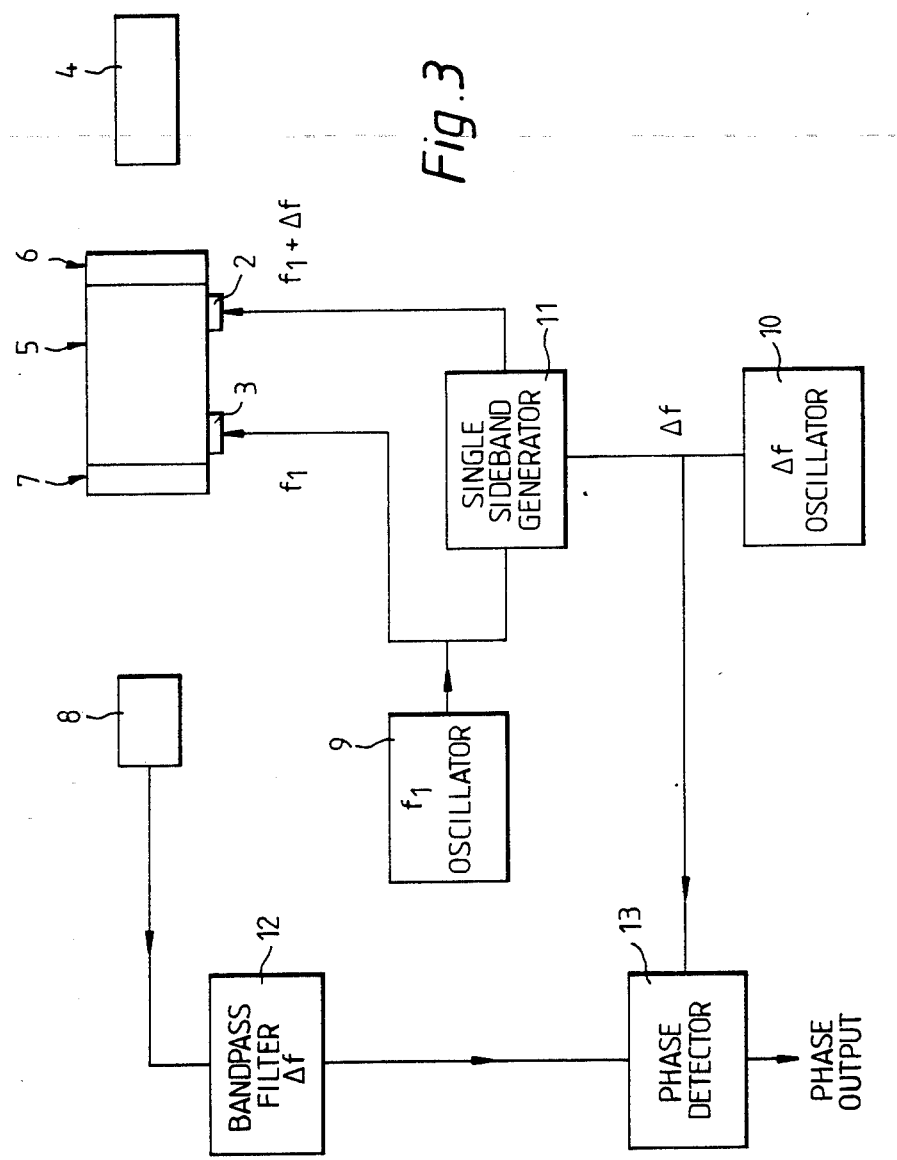
FIG. 3 is a block diagram of the system of the present invention for relative phase measurement.

An electrical arrangement for relative phase measurement and for use with the optical system of FIG. 2 is shown in the schematic system of FIG. 3. A first oscillator 9 generates an electrical signal of frequency $f_1$. A second oscillator 10 generates an electrical signal of frequency $\Delta f$. Frequency $f_1$ being much greater than frequency $\Delta f$. These two signals are combined in a single sideband generator 11 to give an electrical signal of frequency $(f_1+\Delta f)$. Thus electrical signals of frequencies $f_1$ and $(f_1+\Delta f)$ are supplied to respective transducers of the deflector 5. The two acousto-optically deflected beams thus generated are detected by the photodiode 8. The electrical output of the photodiode 8 is passed through a bandpass filter 12 centered on $\Delta f$, and then into a phase measuring system, for example a phase sensitive detector 13, or oscilloscope, where the phase of the signal is compared with the phase of the signal generated by oscillator 10. Thus the relative phase of the two deflected optical beams is measured, albeit relative to an arbitrary reference.

In order to determine the optical angle of incidence $\theta_i$ use is made of the fact that the change in $\Delta\phi$, the phase difference between the two deflected beams, with the sound frequency $f_1$ is predominantly dependent on the optical angle of incidence $\theta_i$ for a given acousto-optic device. Using the system shown in FIG. 3, $\Delta\phi$ is measured for two or more values of sound frequency, say $f_1$ and $f_T$, by changing the frequency of the oscillator 9. The change in $\Delta\phi$ must be monitored between the frequencies $f_1$ and $f_T$ so that phase changes of whole numbers of 360 degrees are not missed. The important measurement is the change in $\Delta\phi$ between $f_1$ and $f_T$, which will be referred to as $\Delta P$. The $\Delta P$ information may be used in two ways. Firstly, $\Delta P$ may be theoretically calculated as a function of $\theta_i$, thus for any measured value of $\Delta P$, $\theta_i$ is known. Alternatively, if $\Delta P$ is not calculated as a function of $\theta_i$, the $\Delta P$ measurement may be used as a reference to allow the optical angle of incidence to be set to the same value for different devices by adjusting the device until the measured $\Delta P$ becomes equal to the reference value.

Phase change minimization, that is the minimization of the value of $\Delta P$ divided by the frequency change $|f_1-f_T|$, is generally important in practical devices, since it is normally desired that the relative phase of the two deflected beams should stay within specified limits over a band of acoustic frequencies.

Figure 4:
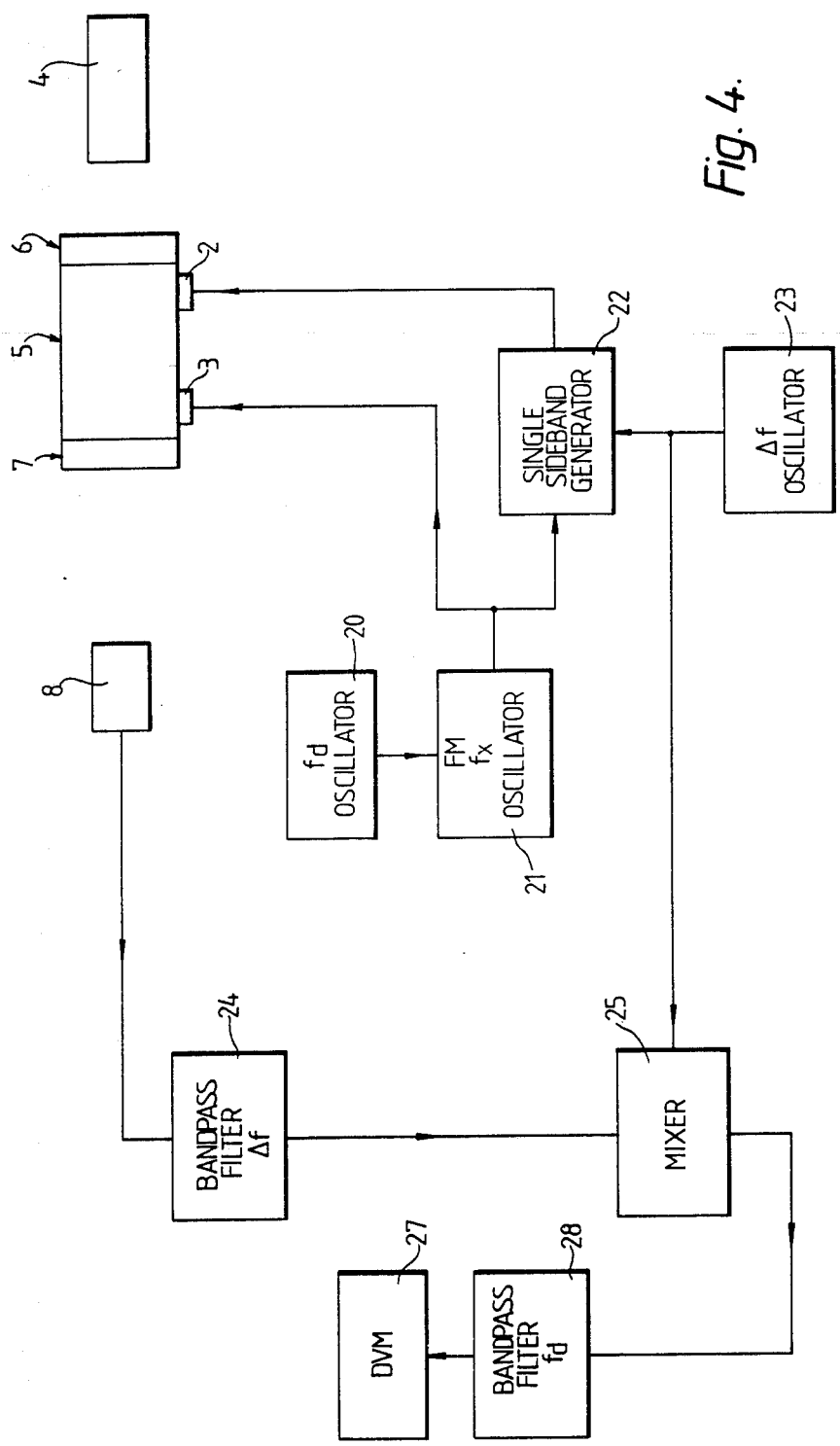
FIG. 4 shows a system of the present invention for phase change minimization.

The system of FIG. 4 comprises a first oscillator 20 for generating an electrical signal of frequency $f_d$ which is fed into the frequency modulator control input of a second oscillator 21 which has a center frequency $f_x$. The output of second oscillator 21 is fed into a single sideband generator 22 together with an electrical signal of frequency $\Delta f$ obtained from a third oscillator 23. The output of the second oscillator 21 is also applied to transducer 3 of deflector 5. The output of single sideband generator 22 is applied to the transducer 2 of deflector 5. By virtue of use of the frequency modulation control input of the second oscillator 21 the signals applied to the transducers are both frequency modulated. The frequency range of the signal applied to transducer 3 is from $(f_x-f_d)$ to $(f_x+f_d)$, while that of the signal applied to transducer 2 is from $(f_x+\Delta f-f_{dev})$ to $(f_x+\Delta f+f_{dev})$. These two signals are $\Delta f$ apart in frequency. The magnitude of $f_{dev}$ is controlled by the amplitude of the signal of frequency $f_d$ fed into the frequency modulation input of oscillator 21.

The two acousto-optically generated beams thus obtained by means of deflector 5 from the output beam of laser 4 are detected by the photodiode 8. The electrical output of the photodiode 8 is passed through a bandpass filter 24 centered on $\Delta f$ which has a sufficiently wide frequency bandpass to allow frequencies $(\Delta f+f_d)$ and $(\Delta f-f_d)$ to pass with only slight attenuation. The electrical signal output from filter 24 is fed into a mixer 25, together with the electrical signal of frequency $\Delta f$ provided by the third oscillator 23. The output of mixer 25 is passed through a bandpass filter 28 centered on $f_d$ and then into an amplitude measuring system 27, for example a digital voltmeter.

The system of FIG. 4 is used in the following manner. The magnitude of $f_{dev}$ is increased, by increasing the amplitude of the signal of frequency $f_d$, until a signal is detected on signal voltmeter 27. The magnitude of $f_{dev}$ is then further increased until a large signal is detected at digital voltmeter 27, but care should be taken that the situation where increasing $f_{dev}$ results in a reduction of the signal detected by digital voltmeter 27 is not reached. The optical input angle, angle of incidence, $\theta_i$ is then adjusted to minimize the signal detected by the digital voltmeter 27. When this is achieved there is attained the desired situation of minimum relative phase change between the two deflected optical beams for acoustic frequency variation.

Once the optical input angle $\theta_i$ is adjusted, some further advantage may be gained by adjusting the electrical phase input to the transducers. This may be achieved by the use of electronic phase shifters in the lines leading to the transducers or by changing the length of the wires leading to the transducers. Again the objective is to minimize the signal detected by the digital voltmeter 27, since this indicates minimum relative phase change between the two deflected optical beams as the acoustic frequency is varied. $\theta_i$ and the electrical phase may be adjusted several times for optimum operation.

As a guide, in practice $f_x$ is greater than 10 times $f_{dev}$, which is greater than 10 times $\Delta f$, which is greater than 10 times $f_d$. Since the above operation basically only includes the minimization of a single signal, the system lends itself to automatic setting.

Thus there is provided a system for accurately and repeatedly setting the angle of incidence of the optical beam relative to two sound waves employed in an acousto-optic deflector, which may be of the surface acoustic wave or bulk acoustic wave type. Slight modification to this system allows the angle of incidence to be set for optimum acousto-optical interaction. This is particularly of benefit for laser printing or copying, and optical spectrum analysis applications of acousto-optic deflectors. A laser printer is a high speed printer which basically comprises means to convert the characters etc. of an input data to be printed to a suitable serial data stream form, a deflection control signal, for example a line scan voltage ramp, being generated in synchronism with the serial data stream; a laser beam source; laser modulator drive circuits which convert the logic pulses in the serial data stream to suitable voltage and current levels for either driving a modulator for a CW (continuous wave) laser or driving the modulation of a semiconductor laser directly; a line scan laser deflector driven in accordance with the line scan voltage ramp referred to above, for example; and optics to focus the deflected laser beam to write on a photo-sensitive surface, such as a rotating selenium drum, to produce an electrostatic pattern of the text character, for example. The drum picks up powdered ink on the electrostatic pattern and deposits it onto plain paper. The ink is set in, for example, a pressure process to produce the printed copy. The laser deflector may comprise a surface acoustic wave type of an acousto-optic deflector comprising a lithium niobate substrate on which is a surface layer of higher refractive index. Surface transducers are employed to generate acoustic waves in the surface layer, which comprises a surface acoustic wave type of an optical waveguide for the laser beam, causing the refractive index of the layer to be modulated and so produce a diffraction grating.

What is claimed is:

1. An acousto-optic deflector system comprising:
   a body of an acousto-optic material;
   first and second transducer means, said first transducer means being driven by a given frequency and said second transducer means being driven by a frequency equal to the sum of the value of said given frequency plus a delta frequency value for producing respective first and second acoustic signals of first and second different acoustic frequencies in said body;
   a laser beam source to establish a laser beam through said body, whereby to produce first and second deflected optical beams from said body;
   common detector means for detecting said first and second optical beams; and
   signal processing means serving in use of the deflector system to separate a component of the output signal of said detector means which component is dependent on the difference between said first and second acoustic frequencies, said signal processing means also detecting the phase of said component corresponding to the relative optical phase of said first and second deflected optical beam.

2. A deflector system as claimed in claim 1 further including means for varying the value of said given frequency for producing differing values of said first and second acoustic frequencies, and wherein said signal processing means serves also to measure the change in said relative optical phase for different values of said first and second acoustic frequencies.

3. In a method of optimizing the angle of incidence in operating an acousto-optic system, said method comprising the steps of:
   launching an optical beam into a body of an acousto-optic material at a given angle of incidence;
   generating a given frequency for producing a first acoustic signal in said body;
   generating a delta frequency;
   combining said given frequency and said delta frequency for producing a second acoustic signal in said body;
   deflecting the optical beam by means of said first and second acoustic signals of differing frequency produced in the body, whereby to obtain respective first and second deflected optical beams;
   detecting said first and second deflected optical beams by means of a common detector;
   processing the detector output signal whereby to separate a component therefrom which is dependent on the frequency difference between said first and second acoustic signals;
   detecting the phase of the detector output signal component for determining the relative optical phase of said first and second deflected optical beams; and
   varying the frequency of said given frequency; and
   detecting the phase of the detector output signal component for different values of the differing acoustic signal frequencies; and calculating the optical beam angle of incidence therefrom.

4. A method as claimed in claim 3 including the step of minimizing changes in the relative optical phase of said first and second deflected optical beams which occur for different values of the differing acoustic signal frequencies.

5. A method as claimed in claim 4, including the step of adjusting the optical angle of incidence of the optical beam in said minimization step.

6. A method as claimed in claim 5, including the step of adjusting the electrical phase of the transducer drive signals in said minimization step.

7. An acousto-optic deflector system comprising:
   a body of an acousto-optic material;
   first and second transducer means;
   a first oscillator of a given frequency coupled for driving said first transducer means for producing a first acoustic signal of a first acoustic frequency in said body;
   a second oscillator of a delta frequency;
   means for driving said second transducer means at a frequency equal to said given frequency plus said delta frequency for producing a second acoustic signal of a second different acoustic frequency in said body;
   a laser beam source to establish a laser beam through said body, whereby to produce first and second deflected optical beams from said body;
   common detector means for detecting said first and second optical beams;
   a bandpass filter for receiving the output of said common detector means; and
   a phase detector for receiving the output of said bandpass filter and said second oscillator for providing an output indicative of the relative optical phase of said first and second deflected optical beams.

8. A deflector system as claimed in claim 7 further including means for varying said given frequency whereby the output of said phase detector varies in accordance therewith.

9. An acousto-optic deflector system comprising:
   a body of an acousto-optic material;
   first and second transducer means, said first transducer means being driven by a given frequency and said second transducer means being driven by a frequency equal to the sum of the value of said given frequency plus a delta frequency value for producing respective first and second acoustic signals of first and second different acoustic frequencies in said body;
   means for varying said given frequency for producing different first and second acoustic frequencies in said body;
   a laser beam source to establish a laser beam through said body, whereby to produce first and second deflected optical beams from said body;
   common detector means for detecting said first and second optical beams; and
   signal processing means serving in use of the deflector system (a) to separate a component of the output signal of said detector means which component is dependent on the difference between said first and second acoustic frequencies, the phase of said component corresponding to the relative optical phase of said first and second deflected optical beams, and (b) to minimize changes in the relative optical phase of the first and second deflected optical beams which occur for different values of said first and second acoustic frequencies.

10. An acousto-optic deflector system comprising:
a body of an acousto-optic material;
first and second transducer means;
a first oscillator of a given frequency;
means for varying the amplitude of the output of said first oscillator;
a second oscillator of a delta frequency;
a frequency modulation oscillator whose output has a center frequency of another frequency different from said given frequency and said delta frequency, said frequency modulation oscillator receiving an input from said first oscillator and providing an output coupled for driving said first transducer means for producing a frequency modulated first acoustic signal of a first acoustic frequency in said body;
a single sideband generator receiving the outputs from said second oscillator and said frequency modulation oscillator for driving said second transducer means at a frequency equal to said delta frequency for producing a frequency modulated second acoustic signal of a second different acoustic frequency in said body;
a laser beam source to establish a laser beam through said body, whereby to produce first and second deflected optical beams from said body;
common detector means for detecting said first and second optical beams;
a first bandpass filter centered on said delta frequency for receiving the output of said common detector means;
a mixer for receiving the outputs from said first bandpass filter and said second oscillator;
a second bandpass filter centered on said given frequency for receiving the output of said mixer; and
signal amplitude measuring means for receiving the output of said second bandpass filter, and wherein said means for varying the amplitude of said first oscillator output is adjusted until said signal amplitude measuring means indicates a signal which increases with increases in said first oscillator amplitude output for enabling adjustment of the optical angle of incidence to minimize the signal of said amplitude measuring means for thus optimizing the optical angle of incidence.

11. A deflector system as claimed in claim 10, including means to adjust the electrical phase input to said first and second transducers whereby to further minimize the amplitude measuring means signal.

* * * * *